Patented Apr. 28, 1936

2,038,865

UNITED STATES PATENT OFFICE 2,038,865

PROCESS FOR SEPARATING FORMIC ACID FROM ACETIC ACID

Theodore O. Wentworth and Stanley Nelson Baechle, Cincinnati, Ohio, assignors to The Vulcan Copper & Supply Co., Cincinnati, Ohio, a corporation of Ohio No Drawing. Application April 2, 1935, Serial No. 14,258

10 Claims. (Cl. 202—42)

This invention relates to a process for the separation of formic acid from acetic acid by distilling the mixture in the presence of a third liquid.

Various methods have concerned themselves with the distillation of aqueous solutions of acetic acid in the presence of an auxiliary liquid, which, by reason of its insolubility in water and the vapor pressure relations dependent thereupon, brings over the water in a low boiling vaporous mixture, sometimes called an "azeotropic" mixture. In this process (see, for example, Othmer U. S. Patent No. 1,917,391), it is usual practice to condense the vaporous mixture of water and withdrawing agent, separate the two layers of water and water-insoluble third liquid respectively, discharge the water layer to waste (or to an auxiliary still for removing the trace of third liquid dissolved therein), and return the third liquid or withdrawing agent to the head of the column as reflux wash for the purpose of bringing over more water in a continuous operation.

Others have used, in such distillation process, hydrocarbons, or halogen derivatives of hydrocarbons in a similar manner for separation of formic acid from acetic acid, taking advantage of the known fact that pure formic acid is insoluble in many organic liquids—notably many of those in this classification.

We have found that thiophene is a very efficient material to be used in this regard because of its insolubility in formic acid. We also have found that its vapor pressure relationships with acetic acid and formic acids are such that when in the presence of both, it has a tendency to distill with the formic acid in an azeotropic mixture, leaving the acetic acid behind. Furthermore, we have found that in the presence of mixtures of acetic and formic acids and of water, thiophene distills off with formic acid in a binary constant boiling mixture, and with water in a second binary constant boiling mixture of slightly different boiling point thus leaving the acetic acid behind free of these two lower boiling materials. Since formic acid and water often are present as impurities in acetic acid, we have found that it is possible to remove both impurities simultaneously by this one operation.

This separation of formic acid and water is preferably conducted in a continuous operation in an analogous manner to the old methods above described for removing water from acetic acid. The mixture of formic acid, acetic acid and water is introduced into a mid-section of a continuously operating column still, which has been charged with thiophene in suitable amounts for the operation. Thiophene forms with formic acid and with water constant boiling mixtures having greater vapor pressures than any mixture of thiophene with acetic acid. Therefore, by the usual action of rectification, thiophene, formic acid and water pass over the head of the column and into the condenser as vapors containing little, if any, acetic acid. This vaporous mixture is condensed and run into a decanting tank, the formic acid and water removed containing only a small amount of thiophene; and the thiophene layer returned as reflux wash to the top of the column still containing only small amounts of formic acid and water.

This process is then carried on in a continuous manner and under such control of feed and heat supply to the column that the acetic acid is discharged from the base of the column entirely free of both formic acid and water.

It will be understood by those skilled in the art that many arrangements of standard equipment may be used to carry out the features of our invention, and will be within the spirit of our disclosure as limited and defined by the appended claims.

In particular, it may be noted that any standard type of distilling column or columns which are efficient for this purpose may be used. The thiophene may be either a pure grade, or mixed with other materials not causing any derogatory action; the dilute acid may be fed into the distilling column or columns either in a liquid or vaporous state; and the discharged acid may be either partly or completely dehydrated, as well as either partly or completely separated from formic acid, and passed from the distillation system in either a liquid or vaporous condition.

Having described our invention, what we claim and desire to secure by Letters Patent, is as follows:

1. In the process of separating formic acid from acetic acid, the use of thiophene as a withdrawing agent, forming an azeotropic mixture, and distilling the azeotropic mixture of the formic acid and thiophene from the acetic acid.

2. In the process of separating formic acid from acetic acid, adding thiophene to a mixture of said acids, distilling the formic acid together with the thiophene, in an azeotropic mixture, and leaving the acetic acid as a residue.

3. In the process of separating formic acid from acetic acid in an aqueous solution, the use of thiophene as a withdrawing agent for the formic acid and water, and the distillation of the azeotropic mixtures of thiophene and formic acid and of thiophene and water from the acetic acid.

4. In the process of separating formic acid from acetic acid in an aqueous solution, the steps which consist in forming two binary constant boiling mixtures of the formic acid and thiophene, and thiophene and water, respectively, and withdrawing the formic acid, water and thiophene by distillation.

5. In the process of separating formic acid from acetic acid in an aqueous solution, introducing said solution into the mid-section of a continuously operating column still charged with thiophene to form constant boiling mixtures with the formic acid, and with the water, respectively and separating said mixtures from the acetic acid by the action of rectification.

6. A process in accordance with claim 5 in which the vaporous mixture withdrawn by the rectification is condensed and the thiophene layer returned to the top of the still as reflux wash.

7. In the process of separating formic acid from acetic acid in an aqueous solution, adding thiophene to a mixture of said acids, forming an azeotropic mixture, and distilling the mixtures of thiophene and formic acid, and of thiophene and water, to remove a substantial part of the formic acid from the residual acetic acid.

8. In the process of separating formic acid from acetic acid in an aqueous solution, adding thiophene to a mixture of said acids, forming an azeotropic mixture, and distilling the mixtures of thiophene and formic acid, and of thiophene and water, to remove a substantial part of the water from the residual acetic acid.

9. In the process of separating formic acid from its admixture with acetic acid and water, introducing said mixture in vaporous state into the mid-section of a continuously operating column still charged with thiophene to form constant boiling mixtures with the formic acid, and with the water, respectively, and separating said mixtures from the acetic acid by the action of rectification.

10. In the process of separating formic acid from acetic acid, introducing said solution into the mid-section of a continuously operating column still charged with thiophene to form a constant boiling mixture with the formic acid, and separating said mixture from the acetic acid by the action of rectification.

THEODORE O. WENTWORTH.
STANLEY N. BAECHLE.